US007143090B2

(12) United States Patent
Spalink et al.

(10) Patent No.: US 7,143,090 B2
(45) Date of Patent: Nov. 28, 2006

(54) METHOD OF SEARCHING-BY-NUMBER AND DEVICE INCLUDING SEARCH-BY-NUMBER FEATURE

(75) Inventors: Karin Spalink, Durham, NC (US); Ramanathan Asokan, Cary, NC (US)

(73) Assignee: Sony Ericsson Mobile Communications, Lund (SE)

( * ) Notice: Subject to any disclaimer, the term of this patent is extended or adjusted under 35 U.S.C. 154(b) by 441 days.

(21) Appl. No.: 10/065,063

(22) Filed: Sep. 13, 2002

(65) Prior Publication Data

US 2004/0054658 A1    Mar. 18, 2004

(51) Int. Cl.
*G06F 17/30* (2006.01)

(52) U.S. Cl. .................... 707/5; 707/6; 707/3

(58) Field of Classification Search .............. 707/1–10, 707/100–104.1; 704/270; 713/281; 455/563, 455/464; 379/142.01, 355.09
See application file for complete search history.

(56) References Cited

U.S. PATENT DOCUMENTS

| | | | | |
|---|---|---|---|---|
| 5,832,531 | A * | 11/1998 | Ayers | 715/500 |
| 5,864,603 | A * | 1/1999 | Haavisto et al. | 379/88.01 |
| 6,026,398 | A * | 2/2000 | Brown et al. | 707/5 |
| 6,192,112 | B1 * | 2/2001 | Rapaport et al. | 379/88.22 |
| 6,442,270 | B1 * | 8/2002 | Simon et al. | 379/355.09 |
| 6,526,292 | B1 * | 2/2003 | Henry, Jr. | 455/563 |
| 6,542,591 | B1 * | 4/2003 | Amro et al. | 379/142.01 |
| 6,963,640 | B1 * | 11/2005 | Manning | 379/355.08 |
| 2003/0130849 | A1 * | 7/2003 | Durston et al. | 704/270 |

FOREIGN PATENT DOCUMENTS

| | | |
|---|---|---|
| EP | 0 920 168 A2 | 6/1999 |
| EP | 1 006 704 A2 | 6/2000 |
| EP | 1 146 716 A1 | 10/2001 |
| EP | 1 193 956 A2 | 4/2002 |
| WO | WO 01/39472 A1 | 5/2001 |
| WO | WO 02/099987 A1 | 12/2002 |

OTHER PUBLICATIONS

U.S. Appl. No. 10/207,640, filed Jul. 29, 2002, Asokan et al.
Steven Upp, Automatic Telephone Number Retrieval, Motorola Inc. Technical Developments, vol. 19, Jun. 1993, Schaumburg, Illinois, US.
Patent Cooperation Treaty, International Search Report, pp. 1-4.
Patent Cooperation Treaty, Written Opinion, pp. 1-2.
Patent Cooperation Treaty, Written Opinion (PCT Rule 66), dated Jun. 3, 2004.

* cited by examiner

*Primary Examiner*—Jeffrey Gaffin
*Assistant Examiner*—Neveen Abel-Jalil
(74) *Attorney, Agent, or Firm*—Charles L. Moore; Moore and Van Allen PLLC

(57) ABSTRACT

A method for searching-by-number includes receiving at least one digit or a sequence of digits and wildcards; and searching any numbers stored in a device to form a match list including any stored numbers matching the at least one digit or the sequence of digits and wildcards.

22 Claims, 4 Drawing Sheets

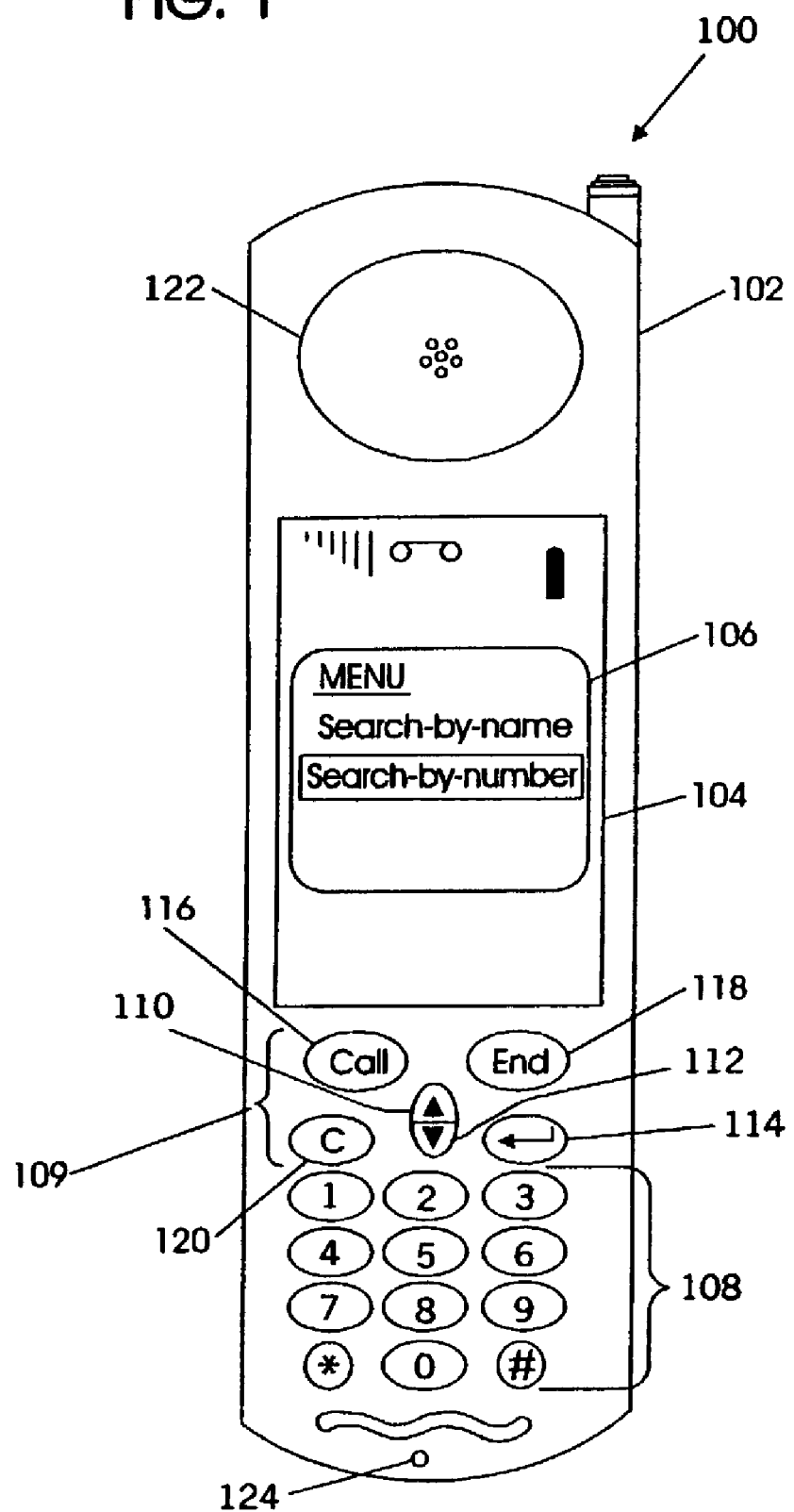

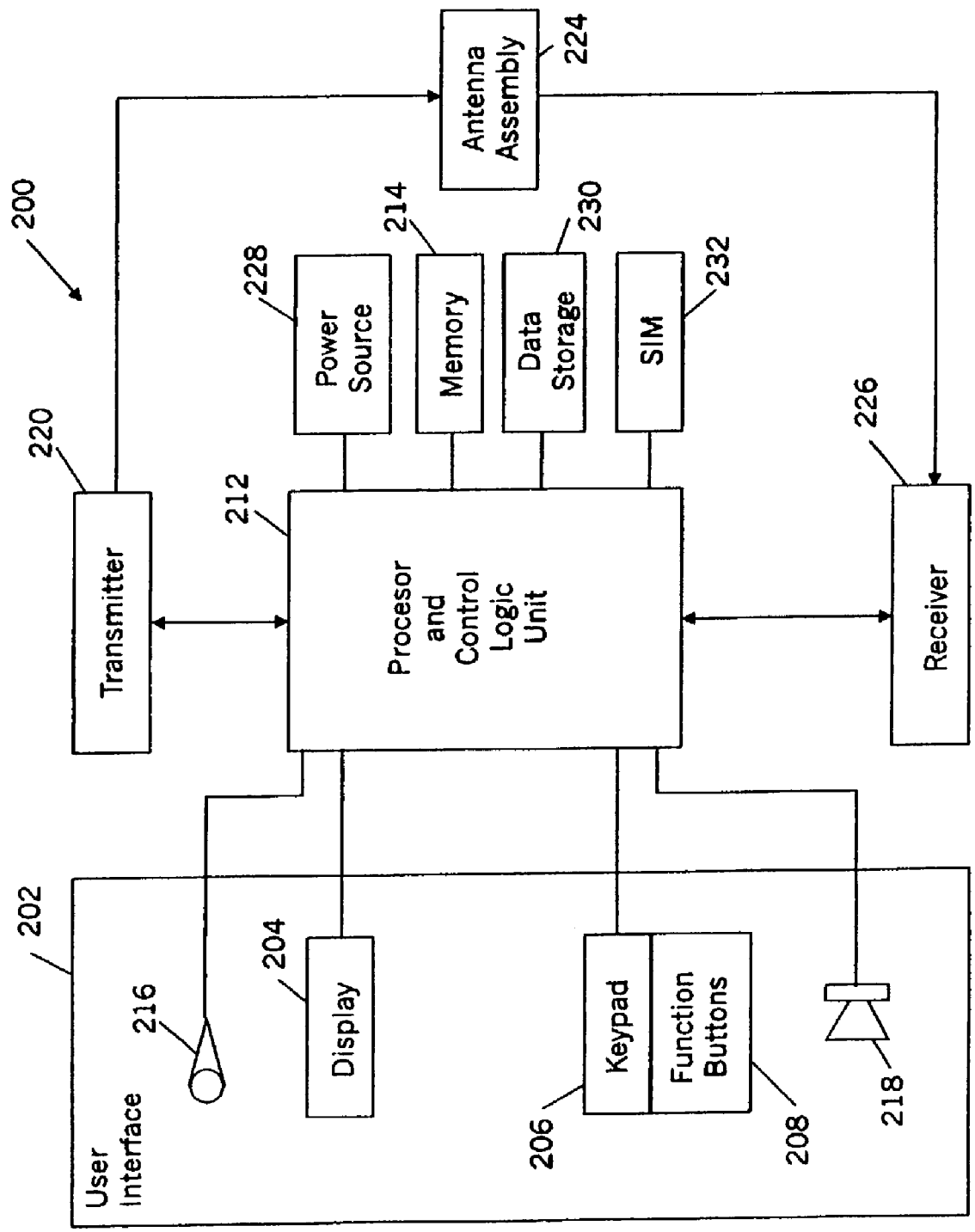

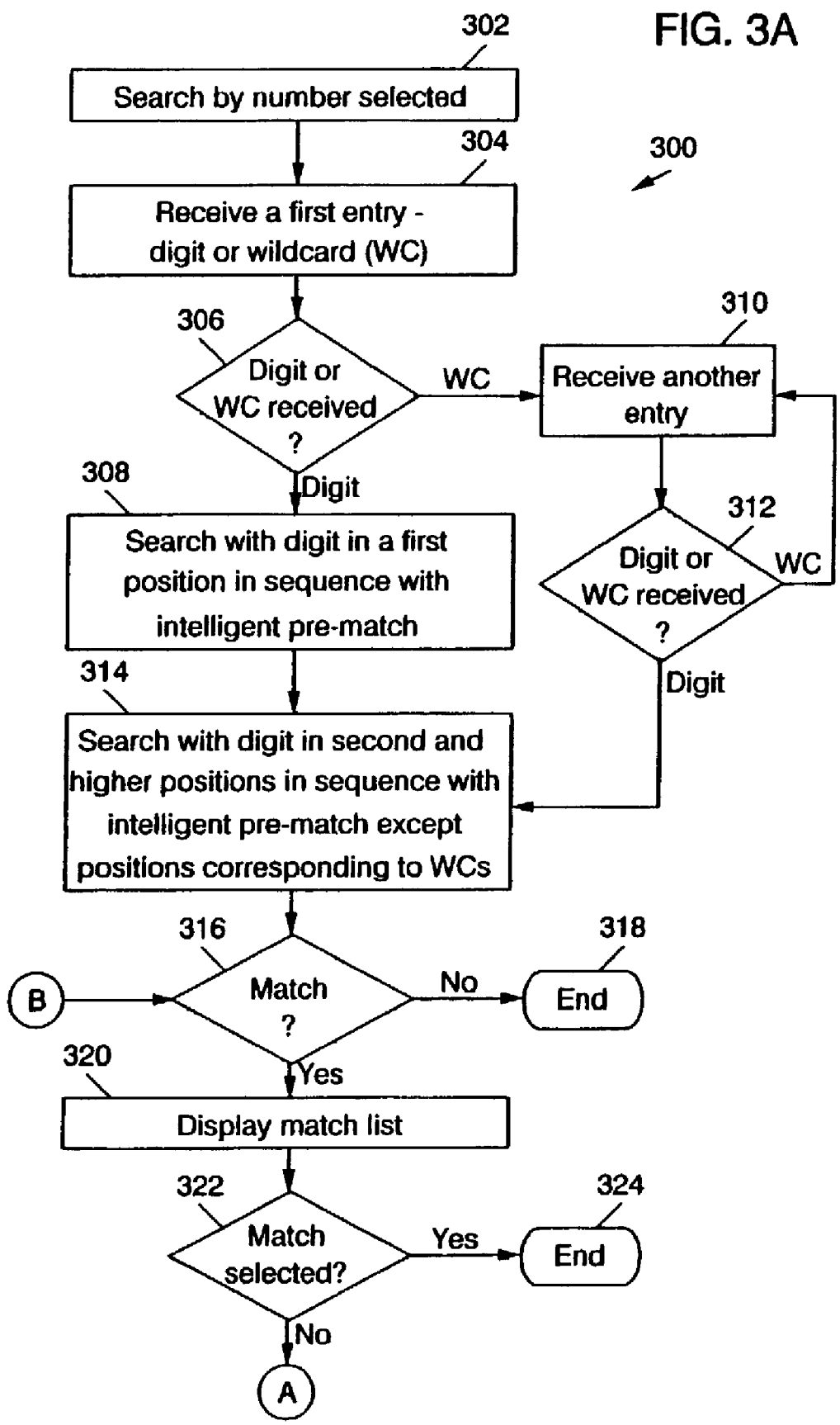

METHOD OF SEARCHING-BY-NUMBER AND DEVICE INCLUDING SEARCH-BY-NUMBER FEATURE

BACKGROUND OF INVENTION

The present invention relates to communication devices, computer devices and the like and more particularly to a method of searching-by-number and a device including a search-by-number feature.

Phone numbers are generally stored in a communication device or the like along with a name or identifier associated with the phone number, and typically, phone numbers can only be searched by the associated name, identifier, or portion of the name or identifier. Under some circumstances, a user may not be able to remember a name or identifier associated with a number but the user may remember a portion of the phone number and desires to locate the complete number to make a call or for some other reason desires to locate the number. There may also be circumstances under which only a phone number is stored by the communication device, such as a list of called numbers (call list), a list of calls that were missed (missed call list) or the like. Under such circumstances, a user can only search by the phone number or portion of the number because the stored number is not associated with any name or identifier. The user may want to store the number with an associated name or identifier or make a phone call or for whatever reason the user may need to find the number but only remembers a portion of the number. Therefore, there may be numerous reasons why a user may need to search for a stored phone number or the like by only a portion of the number. Accordingly, there is a need to provide a method to search phone numbers or the like by number or by a portion of the number. Additionally, there is a need to provide communication devices that can search phone numbers or the like by number or by a portion of the number.

SUMMARY OF INVENTION

In accordance with an embodiment of the present invention, a method of searching-by-number includes receiving at least one digit or a sequence of digits and wildcards. Any numbers stored in a device may then be searched to form a match list that includes any stored numbers matching the at least one digit or the sequence of digits and wildcards.

In accordance with another embodiment of the present invention, a method of searching-by-number includes receiving a first entry. If the first entry is a digit, any stored numbers may be searched to form a match list including any of the stored numbers with the digit in a first position and higher order positions in a sequence of digits forming each stored number. If the first entry is a wildcard, at least one other entry may be received. If the at least one other entry is a digit or at least one wildcard and a digit, any stored numbers may be searched to form a match list including any of the stored numbers with the digit in a second position and in higher order positions in the sequence of digits forming each stored number, except any position corresponding to a wildcard entry.

In accordance with another embodiment of the present invention, a device including a search-by-number feature includes an operator or user interface to receive at least one digit or a sequence of digits and wildcards and at least one data storage device to store a plurality of numbers. A processor may be provided to search the plurality of stored numbers in response to the user interface receiving the at least one digit or the sequence of digits and wildcards. A match list may be formed in response to any stored numbers matching the at least one digit or the sequence of digits and wildcards.

In accordance with another embodiment of the present invention, a computer-readable medium having computer-executable instructions for performing a method is provided. The method may include receiving at least one digit or a sequence of digits and wildcards. Any numbers stored in a device may be searched to form a match list that includes any stored numbers matching the at least one digit or the sequence of digits and wildcards.

BRIEF DESCRIPTION OF DRAWINGS

FIG. 1 is an illustration of an example of a communication device.

FIG. 2 is a block diagram representative of the internal components of a typical communication device.

FIGS. 3A and 3B are a flow chart of a method of searching-by-number in accordance with an embodiment of the present invention.

DETAILED DESCRIPTION

Figure 3B:
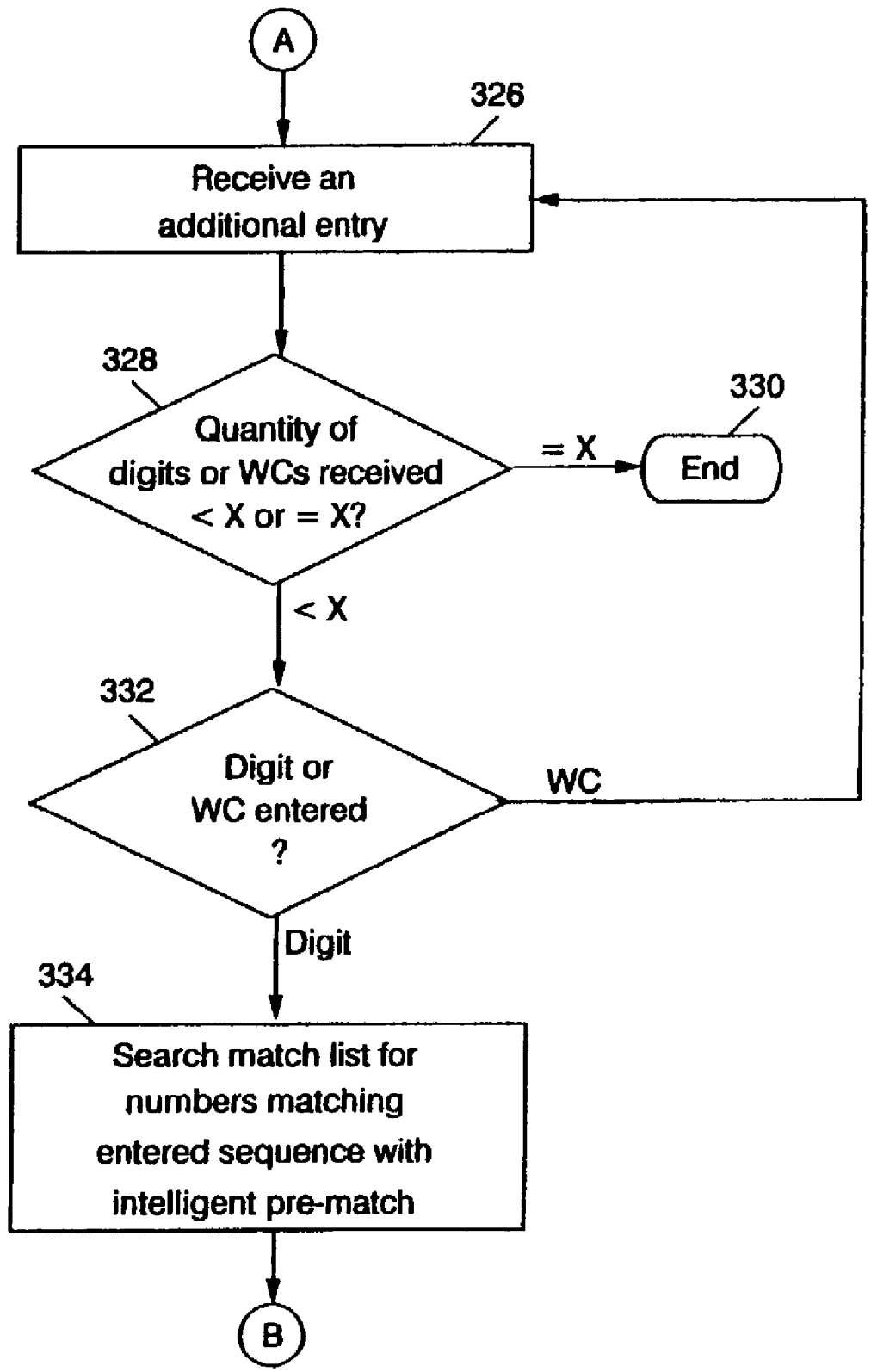

FIG. 1 is an illustration of an example of a communication device 100. The communication device 100 may include a housing 102. A display 104, such as a liquid crystal display (LCD), light emitting diode (LED) panel or the like, may be inserted in an opening in the housing 102 to provide information to a user or operator in the form of text, numerals, characters, or a Graphical User Interface (GUI) 106 or the like. A GUI 106 may be a program interface that may have pictures as well as words, numerals, or other characters on the display screen 104 to provide information to the user or operator. This type of interface takes advantage of a display's graphical capabilities to make programming and use of the communication device 100 easier. The GUI 106 may be used to program or enter information into the communication device 100 including network identifiers, such as phone numbers, names, e-mail addresses, or the like. The present invention, however, is not limited to any one particular method or means of entering information.

The communication device 100 may also include an alphanumeric keypad 108 and function buttons 109 to facilitate entering phone numbers and commands to control operation of the communication device 100. The function buttons 109 may include a scroll-up button 110 and a scroll-down button 112, an enter/YES button 114, a talk/call button 116, an end button 118, and a clear (C) button 120. The scroll-up button 110 and the scroll-down button 112 facilitate navigating through different menus that may be displayed on the display 104 or GUI 106. The enter/YES button 114 may be used to select different items from a displayed menu to control operation of the communication device 100. The talk/call button 116 may be used to answer an incoming call or to initiate an outgoing call after a phone number is entered using the keypad 108. The end button 118 may be used to discontinue an operation of the communication device 100, such as a phone call or the like. The clear button 120 may be used to clear an entry entered from the keypad 108 or to abort or discontinue an operation being performed by the communication device 100. The function buttons 109 shown in FIG. 1 are merely examples of different types of names and functions of such buttons and may differ from one industrial design to another. For example, soft keys may be used to implement some of the functions of buttons 109. Accordingly, the present invention is not intended to be limited by the specific function buttons 109 shown in FIG. 1.

The housing 102 may also include a speaker grill 122 behind which a speaker (not shown in FIG. 1) may be positioned within the housing 102 and a microphone grill 124 behind which a microphone (also not shown in FIG. 1) may be positioned within the housing 102. The search-by-number method of the present invention may be activated or enabled by voice activation using the microphone.

FIG. 1 illustrates an example of a typical layout of a communication device 100, such as a mobile terminal or the like. However, the present invention is not limited to any particular type communication device or design.

FIG. 2 is a block diagram representative of the internal components of a typical communication device 200 that may be the same as the communication device 100 of FIG. 1. The communication device 200 may be a cordless telephone, cellular telephone, personal digital assistant (PDA), communicator, computer device or the like and is not unique to any particular communication standard, such as Advanced Mobile Phone Service (AMPS), Digit Advanced Mobile Phone Service (D-AMPS), Global System for Mobile Communications (GSM), Code Division Multiple Access (CDMA) or the like. The layout shown in FIG. 2 is for purposes of explaining the present invention and the present invention is not limited to any particular design. The communication device 200 may include an operator or user interface 202 to facilitate controlling operation of the communication device 200 including initiating and conducting phone calls, and the like. The user interface 202 may include a display 204, similar to the display 104 of FIG. 1, to provide visual signals to the subscriber or user as to the status and operation of the communication device 200. The user interface 202 may also include a keypad 206 and function buttons 208, similar to the keypad 108 and function buttons 109 of FIG. 1. The keypad 206 and function buttons 208 permit the user to communicate commands to the communication device 200 to dial phone numbers, initiate and terminate calls and to control operation of the communication device 200.

The display 204, keypad 206 and function buttons 208 may be coupled to a main processor and logic unit 212. The main processor and logic unit 212 may be a microprocessor or like. The main processor and logic unit 212 encodes and decodes control signals and performs call processing procedures.

The user interface 202 may also include a microphone 216 and a speaker 218. The microphone 216 receives audio signals from the user and converts the audio signals to electrical signals. The microphone 216 may be connected to the main processor and logic unit 212. The main processor and control logic unit 212 may be connected to a transmitter 220 that converts the baseband signals from the main processor and control logic unit 212 to radio frequency (RF) signals. The transmitter 220 may be connected to an antenna assembly 224 for transmission of the RF signals over the air.

The antenna assembly 224 may receive RF signals over the air and may be connected to a receiver 226 to convert the RF signals to baseband signals. The baseband signals may be applied to the main processor and control logic unit 212. Signals from the main processor and control logic unit 212 may be applied to the speaker 218, and the speaker 218 may convert the electrical signals from the main processor and control logic unit 212 to audio signals that can be understood by the user.

A power source 228 may be connected to the main processor and control logic unit 212 to provide power for operation of the communication device 200. The communication device 200 may also include a data storage device 230 and a subscriber identity module (SIM) 232, smart card or the like. The data storage device 230 may store lists of phone numbers that have been called by the communication device 200, phone numbers for calls that have been missed or not answered by the communication device 200, or phone numbers entered and stored by the user (phonebook or the like). The SIM 232 may include subscriber related information including lists of phone numbers, such as call lists, a phonebook, missed call list and the like.

FIG. 3 is a flow chart of a method 300 of searching-by-number in accordance with an embodiment of the present invention that may be implemented in the communication devices 100 and 200 in FIGS. 1 and 2. In block 302 the search-by-number process may be selected. As an example, the user may operate one or more of the function buttons 109 in FIG. 1 to display a menu in the display 104. The scroll buttons 110 and 112 may be used to highlight or otherwise mark the search-by-number option and the enter/YES button 114 or the like may be used to actually select or enable the search-by-number option. In an alternate embodiment, the search-by-number process or feature may be selected by voice activation or similar means. After the communication device 100 or 200 is enabled to search-by-number a first entry may be received by the communication device 100 or 200 in block 304. The first entry may be entered form the key pad 108 (FIG. 1) or alternatively may be entered by voice recognition or the like. The first entry may be a digit or a wildcard (WC). The wildcard may be used in the search-by-number process as a place-holder that may be occupied by any digit 0–9. In block 306, the method 300 determines whether a digit or a wildcard was received as the first entry in block 304. If the first entry is a digit, the method 300 progresses to block 308 and a search to form a match list is conducted. The search may include all numbers, such as phone numbers or the like, stored in the communication device 100 or 200 with the digit received in block 304 in a first position. The first position may be defined as a left-most position in a sequence of digits that define each of the numbers that may be stored in the communication device 100 or 200. For example in the number 765-4321, the digit in the first position is the numeral 7. The second position may be defined as the next digit in the sequence of digits progressing from left to right. In the example, the digit in the second position is the numeral 6. Higher positions may be defined as subsequent positions in the sequence of digits progressing further from left to right in the numbers that may be stored in the communication device 100 or 200. In the example, the numerals 5, 4, 3, 2 and 1 are in progressively higher positions from left to right. Alternatively, the sequence of digits forming each stored number could be searched in a different order; for example, from right to left with the first position being defined as the right-most position and higher positions being ordered from right to left.

In conducting the search, multiple locations where phone numbers may be stored in a communication device may be searched, such as a call list, a missed call list, a phonebook or the like. The call lists, missed call list, phonebook or the like may be stored in data storage devices, such as data storage device 230, phone memory 214, SIM 232 (FIG. 2) or the like.

If a wildcard is received in block 304, decision block 306 may direct the method 300 to block 310 to receive another entry. In one embodiment of the present invention, the method 300 could time-out and end if another entry is not made within a predetermined time period. In block 312 a determination may be made whether the other entry received in block 310 is a digit or a wildcard. If a wildcard is received the method may return to block 310 to receive another entry. When a digit is received in block 310, the method 300 may progress from block 312 to block 314. In block 314 a search of all stored numbers may be performed to form a match list with the digit entered in block 304 or block 310 in the second and higher positions in a sequence of digits defining or forming each stored number except any position corresponding to a wildcard entry. The search may be accomplished at least in part by searching different data storage devices, memories or areas within a memory of the communication device 200 where phone numbers may be stored, such as call lists, missed call lists, phonebooks or the like. Searching the different memories or areas may be performed in a prescribed manner or order; for example, searching a missed call list first followed by the call list then the phonebook.

In an embodiment of the present invention, the search in blocks 308 and 314 may include an intelligent pre-match process wherein multiple stored variations of the same phone number are only entered in a match list once. For example, a call to 765-4321 may be stored in the communication device 200 including a country code or an area code or both, such as 1-919-765-4321, 919-765-432 or 765-4321. Assuming that it will be very rare that the last four digits will appear with different local area prefixes and that the last seven digits will appear with different area codes or country codes, these variations of the same phone number may be matched and interpreted as the same number and only one entry will be placed in a match list. Alternatively, the pre-match process may be used so that only one number of variations of the same number are ever stored in the communication device 100 or 200 to economize on the storage capacity of the communication device. The pre-match process may also be used for the purpose of creating any type of weighted call list. For example, frequently called numbers may be stored in a special location or listed according to frequency in any call lists.

In block 316, a determination may be made if any stored numbers matched the searches in blocks 308 and 314 to form the match list. If no numbers matched, the process may end at block 318. If matches were found, the match list may be displayed in block 320. The match list may be displayed in a predetermined order. For example, the match list may be displayed in an order corresponding to a position of the searched digits in the stored numbers from left to right, right to left or some other order that facilitates ease of identifying a desired number. If a number in the match list is selected by a user in block 322, the method 300 may end at block 324. If no match number is selected, an additional entry may be received in block 326 (FIG. 3B). In block 328, a quantity of digits or wildcards received may be determined. If the quantity equals a predetermined number, such as enough digits and wildcards for a complete phone number, the method may end at block 330 because all possible stored numbers should have been searched and any matches displayed in a match list. If the quantity of digits or wildcards is less than the predetermined number, a determination may be made in block 332 whether the last entry was a digit or a wildcard. If a wildcard was entered in block 326, the method 300 may return to block 326 for an additional entry. If a digit was entered in block 326, the method may proceed to block 334. In block 334, the current match list may be searched for any numbers matching the entered sequence of digits and wildcards to form a new match list. The method 300 may then return to block 316 to determine if any numbers matched the entered sequence in the search in block 334 to from the new match list. If no matches were found, the method 300 may end at block 318. If one or more matches were found, the new match list may be displayed in block 320 and the method 300 may proceed as shown in FIG. 3 and as previously described.

The search-by-number method 300 may end if no stored numbers match at least one digit or the sequence of digits and wildcards (block 318); a displayed number is selected by the user (block 324); a predetermined number of digits or digits and wildcards have been received (block 330); a predetermined time period has elapsed without an action from the user; or the user aborts the search-by-number method 300 by pressing a clear button or the like, such as the C button 120 in FIG. 1; or some other predetermined signal is received by the communication device 200.

The method 300 may be embodied in a computer readable medium or electronic readable medium, such as memory 214 or the like, having computer-executable instructions for performing the method 300. The computer readable medium may include any type of memory, such as flash memory, floppy disk, compact disc-read only memory (CD-ROM), nonvolatile ROM, random access memory (RAM) or the like.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of search-by-number implemented in a communications device or a computing device, comprising:
   determining in the device whether a digit or wildcard has been entered in the device by a user for each entry until a first digit is entered by the user;
   searching any numbers stored in the device to form a match list including any stored numbers matching a sequence of digits and wildcards entered by the user in response to the user entering the first digit;
   determining in the device whether another digit or another wildcard has been entered in the device by the user for each additional entry until another digit is entered by the user in response to the user not selecting any numbers in the a previous match list;
   searching the previous match list to form a new match list including any numbers matching a current sequence of digits and wildcards entered by the user in response to at least entry by the user being a digit; and
   displaying the new match list.

2. The method of claim 1, further comprising ending the search in response to one of:
   no stored telephone numbers matching the sequence of digits and wildcards;
   a displayed telephone number being selected;
   a predetermined time period elapsing without an action by the user;
   a predetermined number of digits or digits and wildcards being entered; and
   the user aborting the search.

3. The method of claim 1, further comprising displaying each match list in a predetermined order.

4. The method of claim 1, further comprising displaying each match list in an order corresponding to a position of the sequence of digits and wildcards in any stored numbers.

5. The method of claim 1, further comprising displaying the new match list in response to the new match list being formed.

6. The method of claim 1, further comprising displaying only one stored number of a group of stored numbers in each match list that are variations of a same phone number.

7. The method of claim 1, further comprising entering the sequence of digits and wildcards by voice recognition.

8. The method of claim 1, further comprising selecting a search-by-number feature from a menu by voice activation.

9. A method of searching-by-number implemented in a communications device or a computing device, comprising:
    determining in the device whether a digit or a wildcard has been entered in the device by a user for each entry until a first digit is entered by the user;
    searching any numbers stored in the device to form a match list including any stored numbers matching a sequence of digits and wildcards entered by the user in response to the user entering the first digit;
    determining in the device whether another digit or another wildcard has been entered in the device by the user for each additional entry until another digit is entered by the user in response to the user not selecting any numbers in a previous match list;
    searching the previous match list to form a new match list including any numbers matching a current sequence of digits and wildcards entered by the user in response to a last entry by the user being a digit;
    performing an intelligent pre-match before displaying each match list, wherein performing the intelligent pre-match comprises entering only one variation of the same number once in each match list; and
    displaying each match list.

10. A method of searching-by-number implemented in a communications device or a computing device, comprising:
    determining in the device whether a digit or a wildcard has been entered in the device by a user for each entry until a first digit is entered by the user;
    searching any numbers stored in the device to form a match list including any stored numbers matching a sequence of digits and wildcards entered by the user in response to the user entering the first digit;
    determining in the device whether another digit or another wildcard has been entered in the device by the user for each additional entry until another digit is entered by the user in response to the user not selecting any numbers in a previous match list;
    searching the previous match list to form a new match list including any numbers matching a current sequence of digits and wildcards entered by the user in response to a last entry by the user being a digit, wherein the searching is accomplished at least in part by searching a call list, a missed call list and a phonebook; and
    presenting each match list.

11. The method of claim 10, wherein the call list, the missed call list and the phonebook are searched in a predetermined order.

12. A method of searching-by-number implemented in a communications device or a computing device, comprising:
    receiving in the device a first entry by a user;
    receiving an additional entry from the user, when the first entry is a wildcard;
    repeating receiving an additional entry from the user until a digit is received;
    searching any stored telephone numbers to form a match list including any of the stored telephone numbers with a digit in a first position and higher order positions in a sequence of digits forming each stored number;
    searching the match list for telephone numbers matching a sequence of entered digits and wildcards after receiving each additional entry from the user that is a digit forming at least a portion of a complete telephone number; and
    displaying the match list.

13. The method of claim 12, further comprising displaying a new match list including any numbers matching the sequence of entered digits and wildcards from a previous match list.

14. The method of claim 12, further comprising receiving additional entries until a predetermined number of digits and wildcards are entered.

15. The method of claim 12, further comprising ending the method in response to the occurrence of one of:
    receiving a predetermined signal;
    failing to match any numbers in the match list; and
    receiving a predetermined number of digits and wildcards.

16. The method of claim 12, further comprising ending the method in response to the occurrence of one of:
    selecting a number from the match list; and
    receiving a clear or end signal.

17. A device including a search-by-number feature, comprising:
    a processor to search any stored telephone numbers in response to receiving at least one digit or a sequence of digits and wildcards from a user to form at least a portion of a complete telephone number, and to form a match list in response to any stored numbers matching the at least one digit or sequence of digits and wildcards;
    means for receiving an additional entry;
    means for repeating receiving an additional entry until a digit is received from the user;
    means for searching the match list for telephone numbers matching a sequence of entered digits and wildcards after receiving each additional entry from the user that is a digit forming at least a portion of a complete telephone number; and
    a display to display the match list.

18. A device including a search-by-number feature, comprising:
    a processor to search any stored telephone numbers in response to receiving at least one digit or a sequence of digits and wildcards and to form a match list in response to any stored telephone numbers matching the at least one digit or sequence of digits and wildcards;
    means for receiving an additional entry;
    means for repeating receiving an additional entry until a digit is received;
    means for searching the match list for telephone numbers matching a sequence of entered digits and wildcards;
    an intelligent pre-match feature to display only one stored number of a group of stored numbers in the match list that are variations of a same number; and
    a display to present the match list.

19. The device of claim 17, further comprising a feature to end the search by the processor in response to one of:
    no stored numbers matching the at least one digit or the sequence of digits or wildcards;
    a displayed number being selected;

a predetermined time period elapsing after displaying any stored numbers matching the at least one digit or the sequence of digits and wildcards without an input from a user;

a predetermined number of digits or digits and wildcards being entered; and a user aborting the search.

20. The device of claim 17, wherein the at least one data storage device comprises at least one of a call list, a missed call list and a phonebook.

21. A computer-readable medium having computer-executable instructions, when executed or processed on a computer or communications device performs a method, comprising:

receiving at least one digit or a sequence of digits and wildcards from a user;

searching any numbers stored in a device to form a match list including any stored telephone numbers matching the at least one digit or the sequence of digits and wildcards from a user;

receiving any additional entries;

repeating receiving any additional entries until a digit is received from the user;

searching the match list for telephone numbers matching a sequence of entered digits and wildcards after receiving each additional entry from the user that is a digit forming at least a portion of a complete telephone number; and displaying the match list.

22. A computer-readable medium having computer-executable instructions, when executed or processed on a computer or communications device performs a method, comprising:

receiving at least one digit or a sequence of digits and wildcards;

searching any numbers stored in a device to form a match list including any stored telephone numbers matching the at least one digit or the sequence of digits and wildcards;

receiving any additional entries;

repeating receiving any additional entries until a digit is received;

searching the match list for telephone numbers matching a sequence of entered digits and wildcards;

performing an intelligent pre-match before displaying any stored numbers matching the at least one digit or the sequence of digits and wildcards; and displaying the match list.

* * * * *